United States Patent [19]

Winchell

[11] 4,076,270
[45] Feb. 28, 1978

[54] FOLDABLE CAMBERING VEHICLE

[75] Inventor: Frank J. Winchell, Orchard Lake, Mich.

[73] Assignee: General Motors Corporation, Detroit, Mich.

[21] Appl. No.: 713,411

[22] Filed: Aug. 11, 1976

Related U.S. Application Data

[63] Continuation-in-part of Ser. No. 649,967, Jan. 19, 1976.

[51] Int. Cl.² .............................................. B62M 1/04
[52] U.S. Cl. ................................. 280/220; 180/26 R; 280/112 A; 280/218; 280/278
[58] Field of Search ............... 280/87 R, 87 B, 112 R, 280/112 A, 278, 287, 6 R, 6 H, 6.1, 6.11, 200, 210, 218, 220, 221, 224, 282, 12 L, 12 H, 21 R, 21 A; 180/25 R, 26 R, 25 A, 41

[56] References Cited

U.S. PATENT DOCUMENTS

| | | | |
|---|---|---|---|
| 2,593,974 | 4/1952 | Brown | 280/21 R |
| 2,771,145 | 11/1956 | Peters | 180/26 |
| 3,229,782 | 1/1966 | Hilton | 180/26 |
| 3,354,975 | 11/1967 | Stuart | 280/278 |
| 3,623,749 | 11/1971 | Jensen | 280/287 |
| 3,645,558 | 2/1972 | McMullen | 280/270 |
| 3,964,563 | 6/1976 | Allen | 180/41 |

FOREIGN PATENT DOCUMENTS 4,942,586 11/1974 Japan .................................. 280/87 R Primary Examiner—Kenneth H. Betts
Attorney, Agent, or Firm—Edward J. Biskup

[57] ABSTRACT

A cambering vehicle employing a cambering device which interconnects the trailing arms for controlled pivotal movement and includes means for locking the trailing arms together and for allowing the vehicle to be folded into a compact configuration so as to facilitate stowage thereof.

6 Claims, 9 Drawing Figures

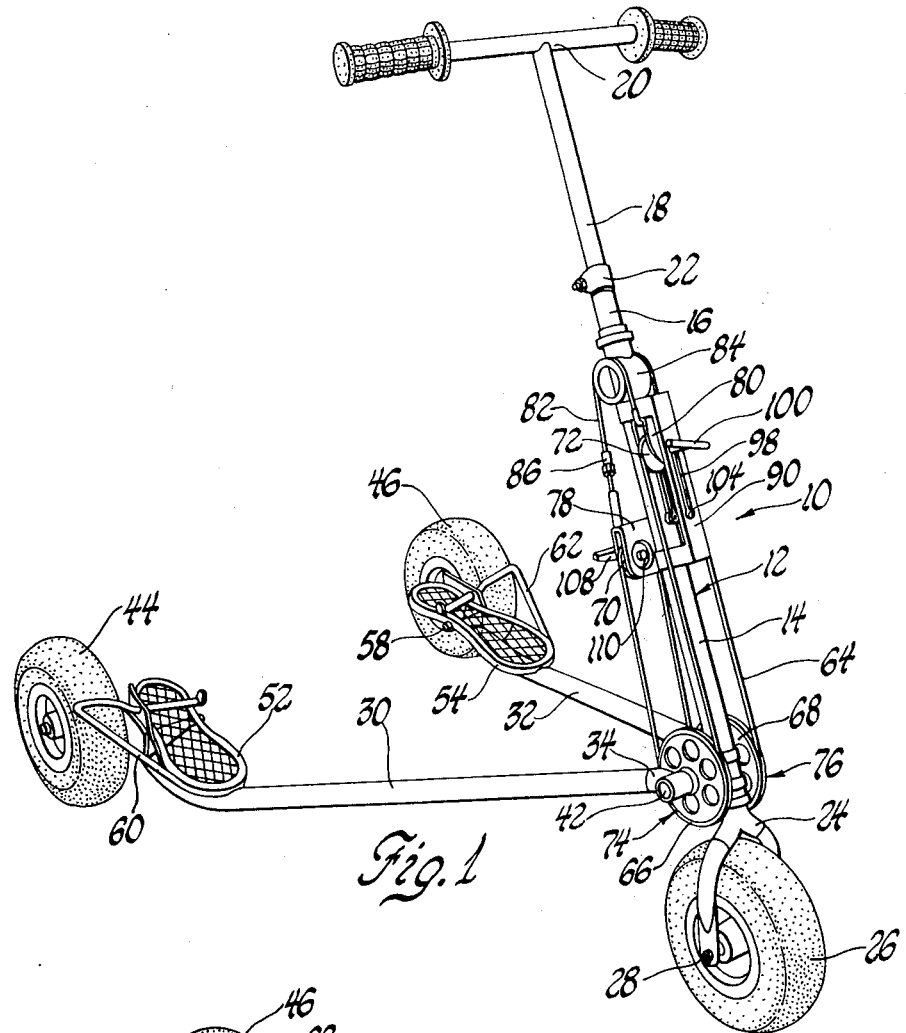
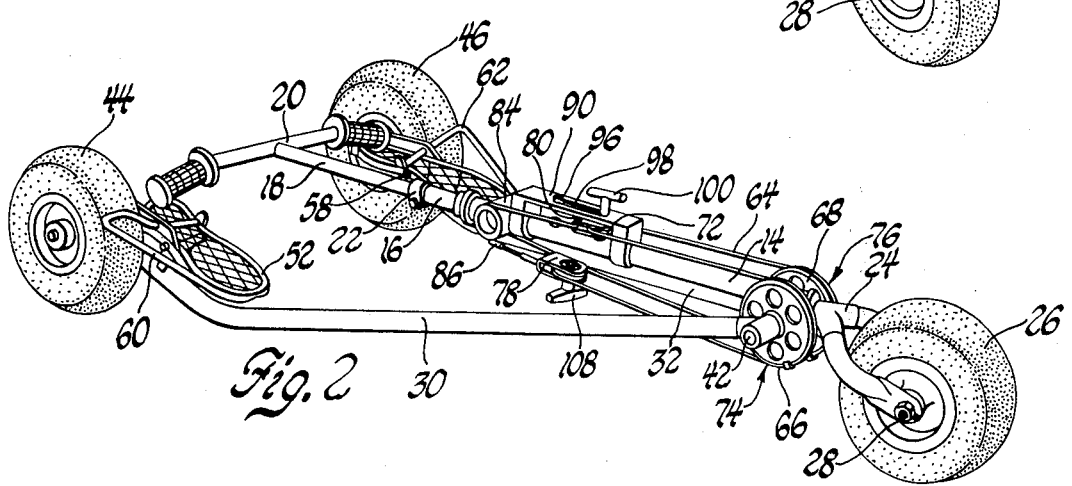

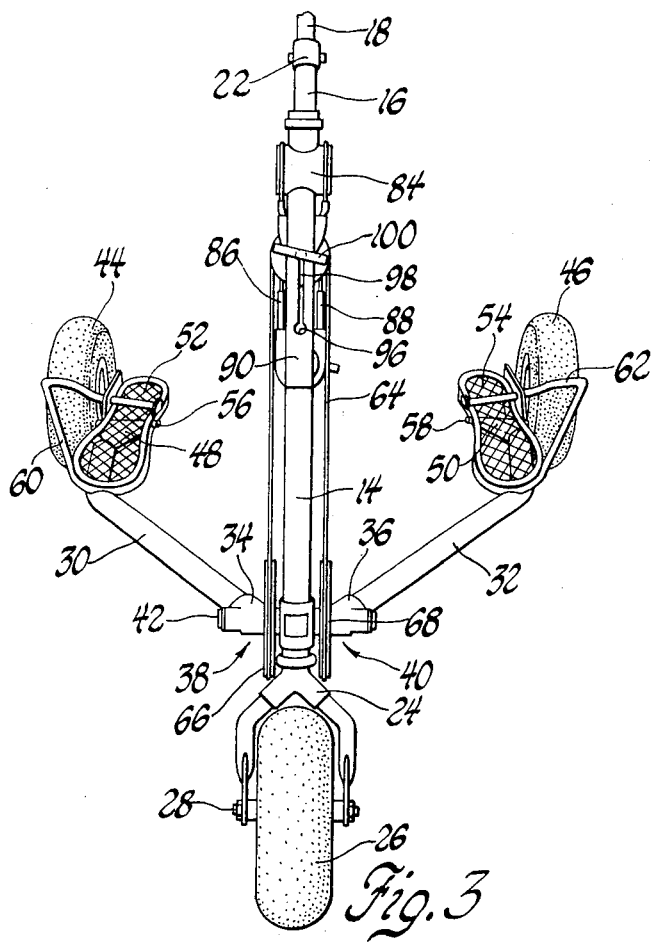

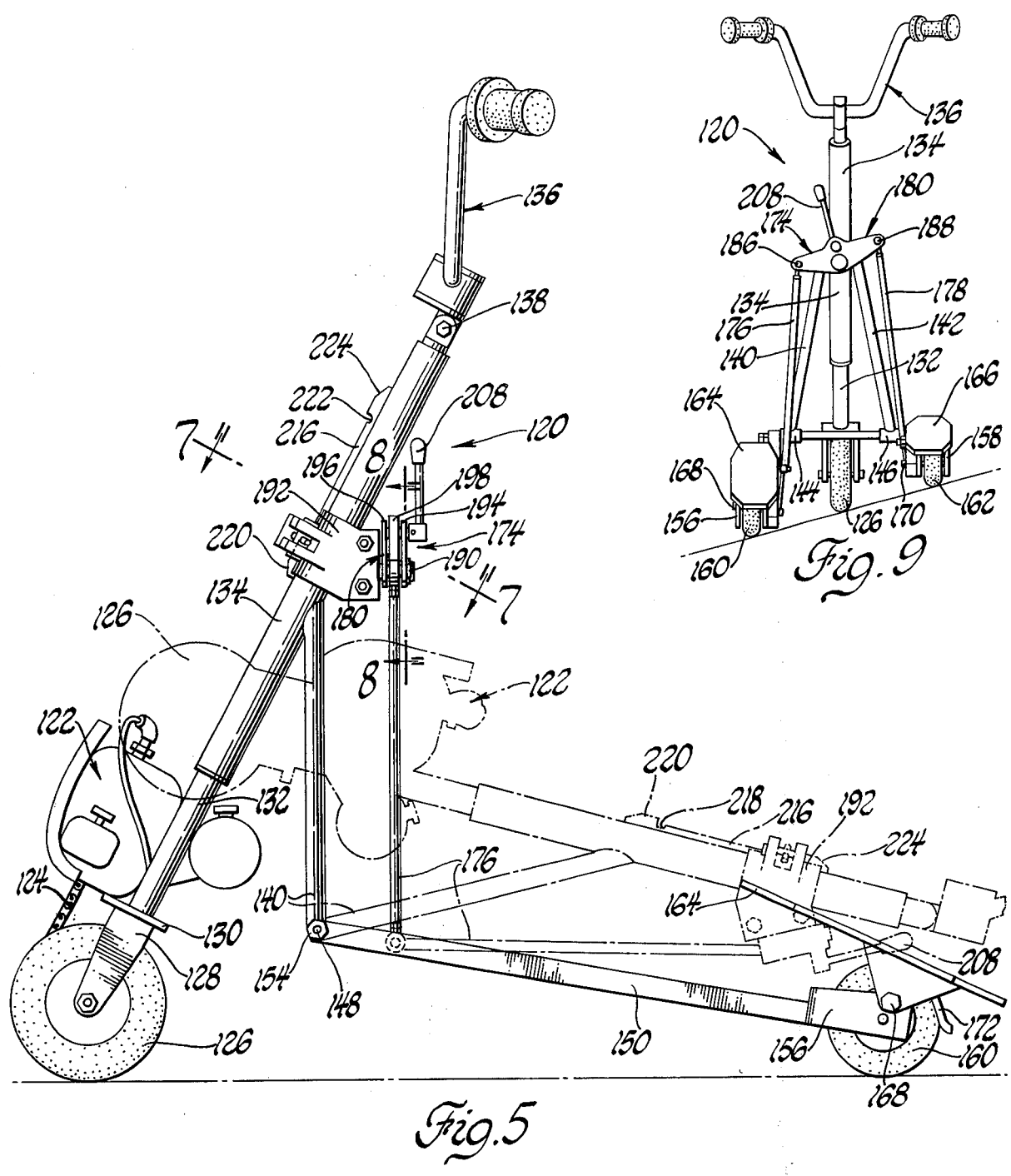

FOLDABLE CAMBERING VEHICLE

This is a Continuation-In-Part of patent application Ser. No. 649,967, filed on Jan. 19, 1976 and entitled "Cambering Vehicle."

This invention concerns cambering vehicles and more particularly a cambering vehicle having a cambering device which permits the vehicle to be collapsed into a compact configuration for stowage purposes and also allows the vehicle to be parked on a level or inclined surface.

Copending patent application Ser. No. 649,967 filed on Jan. 19, 1976 and entitled "Cambering Vehicle" discloses a novel, light-weight cambering vehicle which has a steerable front ground contact means and laterally spaced rear ground contact means. The rear ground contact means are mounted on trailing arms the terminal portions of which are swingable in opposite up and down directions to permit the vehicle to be cambered when the operator tilts the vehicle during cornering maneuvers. This arrangement provides a three-point contact vehicle with the contact means taking the form of wheels, skis, or ice skates. The wheeled vehicle can be powered by an internal combustion engine or an electric motor or if desired, can be manually powered through the natural input from the vehicle operator by the timed shifting of weight from one foot to the other onto the rear ends of the trailing arms. A vehicle of this type can be used as a recreational vehicle when equipped with skis or ice skates or as a short distance general utility or people mover vehicle when equipped with wheels.

The present invention concerns cambering vehicles of the above described type and is directed more specifically to a cambering vehicle employing a cambering device which allows the trailing arms to be locked relative to each other and folded towards the steering frame so as to provide a compact package which can be stored in a minimum of space such as the trunk of a passenger vehicle. According to the invention, a latch and lock mechanism is incorporated with the cambering device which serves to interconnect the trailing arms and controls the equal and opposite movement thereof when the vehicle is leaned into a turn. In one form of the invention, the cambering device consists of a cable and pulley arrangement which interconnects the trailing arms of the vehicle with one pulley being mounted in a clevis that is connected through a cable and appropriate tensioning means to a second pulley which is also mounted in a clevis. One pulley incorporates a screw-operated locking device having a handle which upon rotation in one direction locks the pulley in a fixed position and by doing so, causes the trailing arms to be maintained in fixed relative positions so that the vehicle can be parked on a level or an inclined surface. The clevis of the other pulley is fixed with a pin which is slidable within an elongated slot formed in a bracket secured to the steering frame of the vehicle. By moving the pin vertically relative to the steering frame between two positions, the trailing arms can be positioned for normal operation of the vehicle or locked in a collapsed position with the steering frame and arms located adjacent each other and extending in generally the same direction. In this manner, a cambering device is provided which selectively permits the vehicle to be parked, or if desired, folded into a compact configuration for stowage purposes.

In another form of the invention, the cambering device includes a bell crank member having a pair of laterally extending arms, each of which pivotally supports an equalizer link that extends downwardly for pivotal connection with one of the trailing arms. The cambering device is connected to a collar that is mounted for sliding movement on a tubular column which is a part of the steering frame. A latch mechanism is incorporated with the collar that permits the latter to be locked in a first position along the column which allows normal operation of the vehicle, and a second position which causes the collar to be relocated along the length of the tubular column and is again locked thereto with resultant folding movement of the steering frame relative to the trailing arms so as to provide a compact rigid package to permit the stowage of the vehicle. The bell crank also includes a rotatable lever which through an eccentric causes the trailing arms to be fixed in relative position during the stowage positioning of the steering frame or for purposes of allowing the vehicle to be parked on a level or inclined surface.

The objects of the present invention are to provide a new and improved cambering vehicle having pivoted trailing arms which through an interconnecting cambering device allows the trailing arms to be locked together and folded towards the steering frame so as to provide a compact package for stowage purposes; to provide a new and improved cambering vehicle in which the cambering device interconnects the trailing arms and incorporates locking means for permitting the vehicle to be parked on a level or inclined surface; and to provide a new and improved cambering vehicle having a mechanical cambering device for the trailing arms that includes a locking arrangement for maintaining the trailing arms in fixed relative positions and for allowing the trailing arms to be folded towards the steering frame and to be locked in a collapsed position wherein the steering frame and trailing arms are positioned adjacent each other and extend in generally the same direction so as to provide a compact vehicle configuration that can be stowed in a minimum of space.

Other objects and advantages of the present invention will be apparent from the following detailed description when taken with the drawings in which:

FIG. 1 is a perspective view showing a cambering vehicle incorporating a latch and lock mechanism that allows the trailing arms of the vehicle to be locked together and folded towards the steering frame in accordance with the invention.

FIG. 2 shows the cambering vehicle of FIG. 1 with the steering frame folded into juxtaposition with the trailing arms and locked in this position for stowage purposes.

FIG. 3 is a frontal perspective view of the cambering vehicle shown in FIG. 1.

FIG. 4 is an enlarged side elevational view of the cambering device incorporated with the vehicle shown in FIGS. 1 - 3.

FIG. 5 is a side elevational view of another embodiment of a cambering vehicle which is equipped with a latch and lock mechanism according to the invention incorporated with the cambering device which interconnects the trailing arms.

FIG. 9 is an end view of the vehicle parked on an incline.

Figure 6:
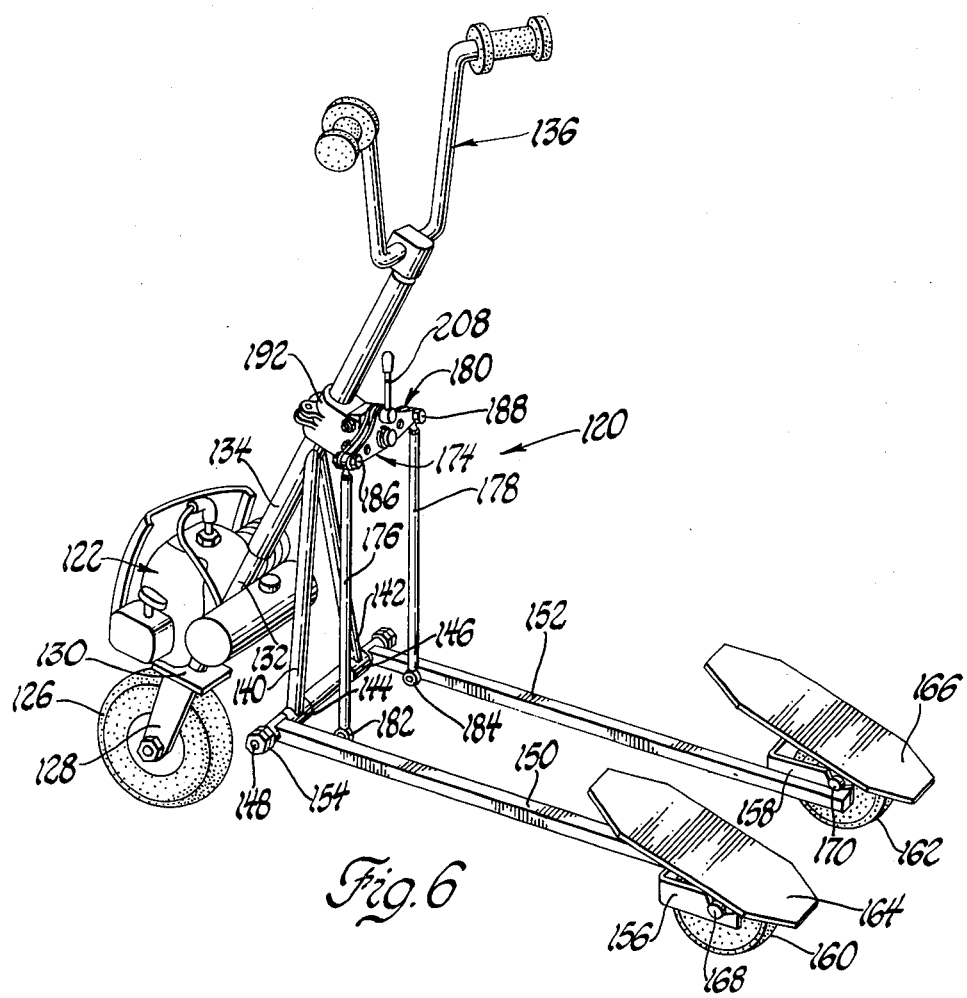
FIG. 6 is a perspective view of the cambering vehicle shown in FIG. 5.

Referring to the drawings and more particularly FIGS. 1 - 4, a cambering vehicle is shown which is adapted to be propelled in a forward direction by a natural input from the vehicle operator through the timed shifting of his weight from one foot to the other coordinated with the left and right cambered steering of the vehicle in a sinuous path. The vehicle is identified by reference numeral 10 and has a frame portion 12 comprising an inclined and elongated cylindrical main frame 14 that axially locates and rotatably supports a tubular steering shaft 16 extending therethrough. The upper end of steering shaft 16 telescopically mounts the centralized connector shaft 18 of handle bar assembly 20. A clamp 22 carried by the upper end of shaft 16 can be constricted by conventional threaded fastener means to hold the handle bar assembly in adjusted position. The steering shaft 16 has a lower bifurcated end 24 which provides a fork for steerable front wheel 26. The wheel 26 rotates on an axle 28 which extends transversely through and is supported by the fork. The vehicle has a pair of tubular trailing arms 30 and 32 which respectively have their forward ends secured in sockets 34 and 36 of right and left side pulley assemblies 38 and 40. The pulley assemblies 38 and 40 are mounted for turning movement on a horizontally extending pivot shaft 42 which is supported by the main frame 14. With this construction each trailing arm is mounted for up and down swinging movement on the axis provided by the pivot shaft 42 and on opposite sides of main frame 14.

Right and left rear wheels 44 and 46 are rotatably mounted on axles which extend laterally and outwardly from the free end of trailing arms 30 and 32, respectively. In addition to supporting the rear wheels 44 and 46, the end of trailing arms 30 and 32 have mounting brackets 48 and 50 secured respectively thereto for right and left foot pads 52 and 54 adapted to support the feet of the vehicle operator. As best shown in FIGS. 1 and 3, the foot pads 52 and 54 are located laterally inboard of the rear wheels 44 and 46 and are tiltably mounted on pivot pins 56 and 58 carried by brackets 48 and 50, respectively. Foot pad 52 disposed inboard of wheels 44 has an outwardly extending tubular friction brake member 60 secured thereto that directly engages the outer periphery of the wheel 44 when the pad is rocked rearwardly on pivot pin 56 by the operator to effect braking of wheel 44. In a forward tilt position of pad 52, the brake member 60 is spaced from wheel 44 so that the wheel can freely rotate. In a like manner, foot pad 54 has an outwardly extending tubular brake member 62 secured thereto which is adapted to directly engage and brake the left rear wheel 46 when pad 54 is rocked rearwardly on pivot pin 58 by the vehicle operator. In the forward tilt position of this pad, the brake member 62 is spaced from the wheel 46 so that it may roll freely.

The trailing arms 30 and 32 are interconnected in a way so that the swinging of one arm on pivot shaft 42 in one direction will tend to swing the other arm automatically in the opposite direction. To this end the arms 30 and 32 are mechanically interconncted by a cambering device that includes endless cable 64 which extends around right and left side trailing arm pulleys 66 and 68 and a pair of transverse upper pulleys 70 and 72. Cable 64 leads from right side pulley 66 around pulley 70 and from pulley 70 around left side pulley 68. From pulley 68 the cable 64 leads around upper pulley 72 and back to the right side pulley 66. Cable 64 is connected to pulleys 66, 68 and 70 by any suitable means to prevent slippage. The pulley 66 forms part of pulley assembly 74 and is rotatable by trailing arm 30, likewise, pulley 68 is part of pulley assembly 76 and is turned by rotation of trailing arm 32. Pulleys 70 and 72 are rotatably supported on clevises 78 and 80 which are adjustably interconnected by a cable 82. As shown, the cable 82 loops through the upper end of clevis 80 and straddling the tubular main frame 14 extends around the right and left sides of a transversely extending tubular shoulder 84 secured to the main frame 14. The terminal ends of cable 82 are connected by threaded cable tensioners 86 and 88 to the clevis 78.

Clevis 80 and its pulley 72 are adjustably mounted with respect to a bracket 90 secured to and extending along an upper portion of elongated tubular main frame 14. As shown, the pulley 72 and its associated clevis 80 are supported by a pivot pin 92 which extends through and rotatably supports pulley 72. The inner end of the pin 92 is removably seated in a cylindrical bearing 94 integral with tubular main frame 14 and extends outwardly from this bearing through the circular upper eye 96 of a keyhole slot 98. Pin 92 terminates in a handle 100 and has a necked or slotted intermediate portion 102 which fits within the narrow track of the keyhole slot 98. With this construction the operator can grasp handle 100 and pull the end of pin 92 out of bearing 94. The handle 100 can be subsequently turned to align the slotted portion 102 of the pin with the narrow track of the keyhole slot 98 so that the clevis 80 and pulley 72 can be lowered as the main frame 14 is being tilted from the vehicle operating position of FIG. 1 to the stowed position shown in FIG. 2. When the lower eye 104 of the keyhole slot 98 is reached, the pin 92 can be pushed inwardly into engagement with a lower bearing 106 integral with main frame 14. In this position, the slotted portion 102 of the pin 92 is misaligned with respect to the narrow track of the keyhole slot 98 so that the vehicle is latched in the stowed position. In a similar manner described in connection with the folding of the vehicle the pin 92 can be disengaged with the lower bearing 106 and the pin and clevis moved upwardly as the main frame is turned from the stowed position of FIG. 2 to the operating position of FIG. 1.

Pulley 70 can be prevented from turning to thereby hold the vehicle in an upright position by the manual turning of locking handle 108. By turning this handle, threaded means 110 is drawn toward the handle so that the sides of clevis 78 frictionally engage the sides of pulley 70 to lock the trailing arms 30 and 32 together for vehicle parking or for stowage purposes.

The operation of the vehicle 10 described above is fully explained in the aforementioned patent application Ser. No. 649,967, however, for present purposes it will suffice to mention that the vehicle is propelled by the operator first grasping the handle bar assembly 20 and placing one foot on one foot pad using his other foot to push off the support surface to give the vehicle an initial velocity. After pushing off, the operator places his feet on their respective foot pads 52 and 54 so that operator input can be imparted into the vehicle for forward propulsion. Initially the operator distributes his weight to his right foot and camber steers the vehicle in an arcuate path towards the left. With the vehicle turning on the arcuate path, the right rear wheel 44 has a turning radius which is greater than the turning radius of the inside or left rear wheel 46. While holding the circular path of the vehicle substantially constant during this turning action and as he leans the vehicle into the turn the operator shifts his weight from his right to his left foot and thus to the left wheel 46. Since the angular momentum has not changed, the shift of the operator's mass to a smaller radius will naturally result in an increase in vehicle velocity. The operator subsequently cambers and steers the vehicle in an opposite direction so that it describes an arcuate path about another center point. Since at the beginning of the second half of the operating cycle the mass of the operator is over the left rear wheel 46, velocity can be again increased by the operator shifting his weight from his left to his right foot. Thus the operator's mass is moved from a larger radius to a smaller radius to again increase net velocity. By repeating this action a net forward travel of the vehicle is achieved. The cambering of the vehicle during the work cycle facilitates operation. With cambering, the track of the vehicle is widened so that the amount of work per cycle is increased. The self propulsion is most effective on flat smooth surfaces where speeds approaching 20 m.p.h. may be obtained.

While the manually propelled cambering vehicle 10 has been illustrated and described with wheels providing the three-point contact, it should be understood that ice runners or skates may be readily substituted for the wheels. Such modifications are shown in the aforementioned patent application Ser. No. 649,967.

FIGS. 5 and 6 show a modified version of the cambering vehicle described above and is generally indicated by the reference numeral 120. In this case, rather than the vehicle being manually propelled, it is equipped with a suitable power plant such as a conventional internal combustion engine 122, the output shaft of which is connected through an endless chain 124 to a spur gear fixed with a front dirigible wheel 126. The wheel 126, in turn, is rotatably supported by a fork 128 which is secured to a flat support plate 130 which is fixed with a steering shaft 132 that is rotatably carried by a tubular column 134 which forms a part of a steering frame. The upper end of the steering shaft 132 is secured to a handle bar assembly 136 by a threaded fastener means 138 so that upon the normal rotation of the handle bar assembly 136, the wheel 126 can be steered in the usual manner. The tubular column 134 fixedly supports the upper ends of a pair of struts 140 and 142 which extend downwardly and respectively terminate in horizontally extending collars 144 and 146 which are horizontally aligned and rigidly support a transversely extending pivot shaft 148.

The tubular column 134 together with the struts 140 and 142 provide the steering frame for the vehicle 120 that pivotally supports a pair of laterally spaced trailing arms 150 and 152. In this regard, it will be noted that the trailing arms 150 and 152 are mounted for swinging movement on the pivot shaft 148 and are maintained in position by retainer nuts 154 which are threaded on the ends of the pivot shaft outboard of the ends of the trailing arms. The trailing arms 150 and 152 are of equal length and are respectively formed with support brackets 156 and 158 which rotatably support rear wheels 160 and 162. Foot pads 164 and 166 for supporting the right foot and left foot of the operator are disposed above the wheels 160 and 162 and are mounted for limited rocking motion about pivot bolts 168 and 170. Each of the foot pads 164 and 166 has the rear end thereof formed with an arcuate friction brake member 172 which serves to frictionally engage the peripheral surface of the associated rear wheel for vehicle braking when the operator transfers his weight to his heels.

The trailing arms 150 and 152 are interconnected to each other through a cambering device 174 which includes a bell crank linkage comprising generally parallel side links 176 and 178 and bell crank member 180. The side links 176 and 178 are pivotally connected at their lower ends to the trailing arms 150 and 152 by pivot bolt members 182 and 184 respectively. The upper ends of the links 176 and 178 are pivotally connected to the bell crank member 180 by pivot bolt members 186 and 188 each of which supports a spherical bearing member (not shown) that allows limited universal pivotal movement of the upper end of the associated link. The center of the bell crank member 180 is supported for pivotal movement by a pivot pin 190 which extends outwardly from and is rigid with a collar or support member 192 mounted for sliding movement on the tubular column.

Figure 8:
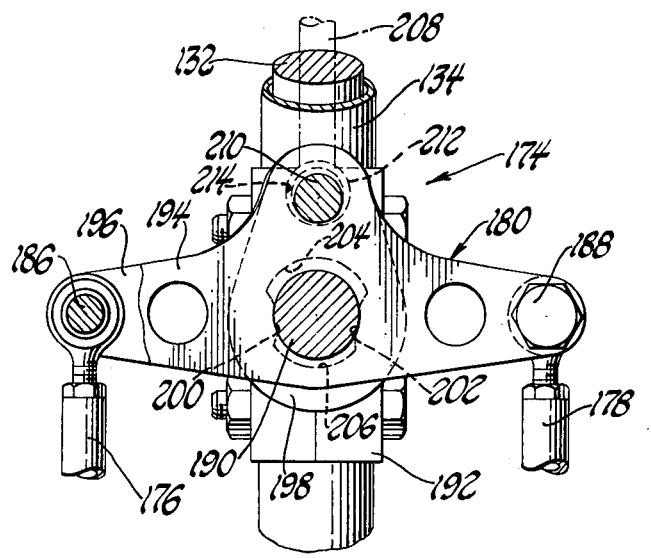
FIG. 8 is an enlarged elevational view taken on lines 8—8 of FIG. 5.

As seen in FIG. 5 and 8, the bell crank member 180 consists of two identical plates 194 and 196, the outer ends of which are interconnected through the pivot bolt members 186 and 188 which support the upper ends of the links 176 and 178. Between the plates 194 and 196 is a lock member 198 having an aperture formed therein defined by a pair of inclined side walls 200 and 202 and upper and lower curved walls 204 and 206. The pivot pin 190 is located within the aperture of the lock member 198 so that upon raising the latter, the side walls 200 and 202 engage the periphery of the pivot pin 190 and lock the bell crank member 180 thereto. This occurs when a lock lever 208 rotatably carried by the bell crank member 180 is located in the upward position with its longitudinal axis aligned with the longitudinal axis of the tubular column 34 as seen in FIGS. 6 and 8. In this regard, it will be noted that the lock lever 208 is rigidly connected to a horizontally extending cylindrical shaft 210 rotatably supported between the plates 194 and 196. The shaft 210 has an eccentric 212 rigidly formed thereon which is located in an opening 214 corresponding in shape with the eccentric and positioned in the upper portion of the lock member 198. Due to the eccentric 212 on shaft 210, rotation of the connected lock lever 208 from the raised full line position of FIGS. 5 and 6 to a diametrically opposed lowered position causes the eccentric 212 to lower the lock member 198 relative to the bell crank member 180 so that the inclined side walls 200 and 202 are no longer in wedging engagement with the outer surface of the pivot pin 190. As a result, the bell crank member 180 will then be free to rotate about the pivot pin 190.

As should be apparent from the above description, the lock lever 208 will always be located in the lowered position when the cambering vehicle 120 is being operated. The lock lever 208 will only be placed in the raised position of FIG. 8 when the vehicle is parked or when the vehicle is to be folded into its stowage configuration. Accordingly, as seen in FIGS. 5 and 8, the bell crank member 180 is in the raised lock position and through the links 176 and 178 maintains the trailing arms 150 and 152 in fixed relative positions so that the operator can leave the vehicle and the latter will remain upward without additional support. Thus, the vehicle can be parked on a level surface as seen in FIG. 5. It should also be apparent that the vehicle 120 can be parked on an inclined surface in which case the centers of the pivot bolt members 186 and 188 will be located in a horizontal plane substantially parallel to the inclined support surface while the column 134 would be vertically oriented. In other words, the laterally extending arms of the bell crank member 180 will be tilted relative to the longitudinal axis of the steering frame as seen in the rear elevational view of the vehicle 120 as seen in FIG. 9. This does not, however, effect the operation of the lock member 198 and the latter will serve to lock the bell crank member 180 to the pivot pin 190 by rotating the lock lever 208 to a raised position with the longitudinal axis thereof aligned with centers of the shaft 210 and pivot pin 190.

Figure 7:
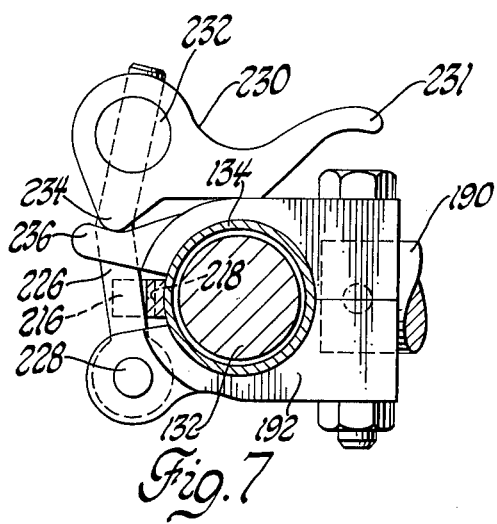
FIG. 7 is an enlarged sectional view taken on lines 7—7 of FIG. 5.

The collar 192 is shiftable upwardly along the tubular column 134 and thereby causes the vehicle to be collapsed into a compact rigid package that can be stowed in a minimum of space. In this connection, it will be noted that the front portion of the tubular column 134 is rigidly formed with an elongated bar 216 having a notch 218 and stop 220 at its lower end and a notch 222 and stop 224 at its upper end. In order to maintain the collar 192 in each of the aforementioned positions, a latch mechanism is provided which consists of a bent bolt 226, one end of which is pivotally supported by the collar 192 by a vertically oriented pivot pin 228 while the other end of the bolt 226 pivotally carries a hand-operated lock lever 230. The lock lever 230 includes a handle 231 and is supported for pivotal movement by a vertical pin 232 fixedly connected with the bolt 226 and includes a projection 234 which is adapted to engage the outer surface of a tab 236 integrally formed with the collar 192. As seen in FIG. 7, the bolt 226 is located in the lower notch 218 and maintains the collar 192 and, accordingly, the cambering device 174 in the normal operating position of the vehicle.

When it is desired to fold the steering frame of the vehicle into the phantom line position of FIG. 5, the lock lever 230 as seen in FIG. 7 is pivoted in a counterclockwise direction about its pivot pin 232 causing the projection 234 to be moved out of engagement with the tab 236. This causes the bolt 226 to swing in a counterclockwise direction about its pivot pin 228 so as to move the bolt 226 out of the notch 218. With the bolt removed from the lower notch 218 the collar 192 is free to slide upwardly along the column 134 while the steering frame pivots clockwise about pivot shaft 148. The collar moves along the column until it engages stop 224, at which time the bolt 226 is positioned adjacent the upper notch 222. At such time, the steering frame is in the phantom line position and by moving the bolt 226 in a clockwise direction about pivot pin 228 into notch 222 followed by similar rotation of the lock lever 230, the projection 234 is forced into engagement with the tab 236 and the collar is again placed in a locked condition relative to the steering column 134. As the projection 234 is cammed into engagement with the tab 236, the clockwise rotation of the handle 231 causes the projection 234 to move along the tab until the handle 231 contacts the collar 192. At this point, the projection 234 is located to the left of a straight line connecting the centers of pivot pins 228 and 232 so that an over-center position is assumed by the lock lever 230 placing the latch in a locked condition. It will be understood that the bell crank member 180 is in the locked position of FIG. 8 during the folding movement of the steering frame.

In operation of vehicle 120, the operator will first position the lock lever 208 in the lowered unlocked position and then will step on the foot pads 164 and 166 in any sequence and grip the handle bar assembly 136. The operator will then assume a normal stance or lean forwardly with a slight hand pressure on the handle bar assembly 136 so that the foot pads are tilted forwardly. Assuming that the vehicle engine 122 has been started and with the operator's body weight distributed on the front part of the foot pads 164 and 166, the throttle (not shown) is opened by the operator to proceed in a straight course. Lateral stability is provided by the natural upright stance of the operator. Assuming that a tight right turn is to be negotiated, the operator can turn the handle bar assembly 136 slightly to the right and readily lean into the turn, thus shifting weight to tilt or roll the vehicle about its roll axis. This rolling action causes the front end of the trailing arm 152 as seen in FIG. 6 to be raised and the front end of trailing arm 150 to be lowered. Thus, trailing arm 152 will pivot in its plane counterclockwise about pivot shaft 148 and trailing arm 150 will concurrently pivot in its plane clockwise about the pivot shaft 148 through the same angle. The cambering device 174 interconnecting the trailing arms 150 and 152 ensures that the pivotal movement of the trailing arms is equal and opposite. When the vehicle is leaned into a turn, all three wheels 126, 160, and 162 remain in contact with the ground and camber an amount equal to vehicle roll. After the cambering vehicle 120 has been driven, it can be parked on a level or inclined surface by rotating the lock lever 208 to the raised locked position, or if desired, the vehicle can be folded and locked as aforedescribed for stowage purposes.

Various changes and modifications can be made in this construction without departing from the spirit of the invention. Such changes and modifications are contemplated by the inventor and he does not wish to be limited except by the scope of the appended claims.

What is claimed is:

1. In combination with a cambering vehicle having an upright frame provided with a pair of trailing arms the forward ends of which are pivotally connected to said frame and having a mechanical cambering device for interconnecting the trailing arms so they move in equal and opposite directions when the vehicle is leaned into a turn, means for locking said cambering device so as to cause said trailing arms to maintain fixed relative positions, and means connected to said cambering vehicle for causing said frame and trailing arms to fold towards each other and be locked in a collapsed position wherein said frame and trailing arms are positioned adjacent each other and extend in generally the same direction so as to provide a compact rigid package that can be stowed in a minimum of space.

2. In combination with a cambering vehicle having an upright frame provided with a pair of trailing arms the forward ends of which are pivotally connected to said frame and having a mechanical cambering device for interconnecting the trailing arms so they move in equal and opposite directions when the vehicle is leaned into a turn, means carried by said cambering device for locking said cambering device so as to cause said trailing arms to maintain fixed relative positions, and means operatively associated with said cambering device for causing said frame and trailing arms to fold towards each other and be locked in a collapsed position wherein said frame and trailing arms are positioned adjacent with each other and extend in generally the same direction so as to provide a compact rigid package that can be stowed in a minimum of space.

3. In combination with a cambering vehicle having a steering frame provided with a pair of trailing arms the forward ends of which are pivotally connected to said steering frame and having a cambering device including a bell crank member and a pair of links for interconnecting the trailing arms so they move in equal and opposite directions when the vehicle is leaned into a turn, a support member for said bell crank member mounted on said steering frame for sliding movement between a first position wherein said steering frame and trailing arms are located for normal vehicle operation and a second position wherein said vehicle assumes a low profile configuration, means carried by said bell crank member for locking said cambering device so as to cause said trailing arms to maintain fixed relative positions, and means connected to said support member for locking the latter in said first and second positions.

4. A three-point contact cambering vehicle comprising a steering frame, including an upright tubular column, an elongated steering shaft mounted for turning movement in said tubular column, a steerable front contact means operatively connected to one end of said steering shaft for engagement with a support surface, a manual steering device operatively connected to the other end of said steering shaft, a pair of elongated trailing arms extending rearwardly from said frame, laterally spaced rear contact means operatively connected to end portions of said trailing arms for engagement with the support surface, foot support means for an operator of the vehicle mounted on each of said trailing arms adjacent to each of said rear contact means, pivot means swingably mounting said trailing arms to said steering frame on an axis extending laterally thereof, a mechanical cambering device including a rotatable member carried by said steering frame and interconnecting said trailing arms to permit the latter to swing in separate planes allowing the operator to roll said vehicle with respect to its roll axis and cause said trailing arms to move through equal amounts in opposite directions, and means selectively engageable with said rotatable member for locking said cambering device so as to cause said trailing arms to maintain fixed relative positions when the vehicle is parked on a level surface or an inclined surface.

5. The cambering vehicle of claim 4 wherein said cambering device includes a bell crank member supported by said column and said means for locking said cambering device is rotatably carried by said bell crank member.

6. A cambering vehicle comprising an upright frame provided with a pair of trailing arms having forward ends thereof pivotally connected to opposite sides of the frame for rotation about substantially transverse axes, a mechanical cambering device interconnecting the trailing arms for movement in equal and opposite directions through substantially equal angles about their axes when the vehicle is leaned into a turn, a selectively operable locking device effective to lock the trailing arms at will to maintain fixed relative positions of the trailing arms about their axes, and means operatively associated with said locking device and constructed to permit the frame and the trailing arms selectively, to be folded at will towards each other about the said axes and to be locked in a collapsed position in which the frame and the trailing arms are positioned adjacent each other and extend in generally the same diection so as to provide a compact rigid package that can be stowed in a minimum of space.

* * * * *